United States Patent
Chen (10) Patent No.: US 9,201,576 B2
(45) Date of Patent: Dec. 1, 2015

(54) DISPLAY METHOD AND PORTABLE DEVICE

(71) Applicant: Yi-Jing Chen, Taipei (TW)

(72) Inventor: Yi-Jing Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 185 days.

(21) Appl. No.: 13/854,969

(22) Filed: Apr. 2, 2013

(65) Prior Publication Data

US 2013/0298081 A1 Nov. 7, 2013

Related U.S. Application Data

(60) Provisional application No. 61/641,907, filed on May 3, 2012.

(30) Foreign Application Priority Data

Feb. 8, 2013 (TW) .............................. 102105338 A (51) Int. Cl.
  *G06F 3/14* (2006.01)
  *G06F 3/0484* (2013.01)
  *H04M 1/725* (2006.01)
  *G06F 1/16* (2006.01)

(52) U.S. Cl.
  CPC .......... *G06F 3/04842* (2013.01); *G06F 1/1632* (2013.01); *H04M 1/72522* (2013.01); *H04M 1/72527* (2013.01); *H04M 2250/22* (2013.01)

(58) Field of Classification Search
  CPC ..................................... G06F 3/14; G06F 3/17

USPC ........... 715/200–277, 700–867; 345/30–111; 705/50–79; 709/201–229, 248; 235/454, 462.01

See application file for complete search history.

(56) References Cited

U.S. PATENT DOCUMENTS

| | | | |
|---|---|---|---|
| 7,194,557 B1 * | 3/2007 | Peacock ........................ | 709/248 |
| 2002/0030104 A1 * | 3/2002 | Matsui et al. ................. | 235/454 |
| 2007/0152058 A1 * | 7/2007 | Yeakley et al. ........... | 235/462.01 |
| 2008/0134061 A1 | 6/2008 | Banerjee et al. | |
| 2008/0216022 A1 * | 9/2008 | Lorch et al. ................... | 715/847 |
| 2012/0233565 A1 * | 9/2012 | Grant ............................ | 715/776 |
| 2012/0311438 A1 * | 12/2012 | Cranfill et al. ................ | 715/256 |

FOREIGN PATENT DOCUMENTS

| | | |
|---|---|---|
| TW | 200519734 | 6/2005 |
| TW | 201102836 | 1/2011 |

* cited by examiner

*Primary Examiner* — Ruay Ho
(74) *Attorney, Agent, or Firm* — Jianq Chyun IP Office (57) ABSTRACT

A display method and a portable device are provided. The portable device has a touch screen, and a plurality of application programs is installed in the portable device. The touch screen displays a menu interface and an object corresponding to each application program. When the object corresponding to each application program is displayed, obtain a display format supported by the application program, and determine whether the display format supported by the application program matches a first display format of the touch screen of the portable device. When the display format supported by the application program does not match the first display format of the touch screen, a first annotation message is shown on the object corresponding to the application program.

5 Claims, 5 Drawing Sheets

DISPLAY METHOD AND PORTABLE DEVICE

CROSS-REFERENCE TO RELATED APPLICATION PROGRAM

This application claims the priority benefits of U.S. provisional application Ser. No. 61/641,907, filed on May 3, 2012, and Taiwan application serial no. 102105338, filed on Feb. 8, 2013. The entirety of each of the above-mentioned patent applications is hereby incorporated by reference herein and made a part of this specification.

BACKGROUND OF THE INVENTION

1. Field of the Invention

The present invention generally relates to a portable device, and more particularly, to a display method of a portable device.

2. Description of Related Art

Along with the development of technologies, portable devices, such as cell phones, smart phones, personal digital assistant (PDA) phones, tablet PCs, and notebook computers, have been broadly used in our daily life. Operating systems on these portable devices, such as Application programme such as iOS and Google Android, allow users to install third-party application programs. Namely, a user can directly download third-party application programs onto a portable device through the Internet. Some application programs support only the display specification of tablet PCs but not that of smart phones, while some other application programs support only the display specification of smart phones but not that of tablet PCs. Thus, when an application program designed regarding a specific display specification is installed on an unsupported portable device, the application program cannot be appropriately executed, or errors will be produced when the application program is executed. However, presently, after a user downloads an application program into a portable device, the user is usually not able to find out whether the application program is designed regarding a specific display specification. Thus, when the user executes the application program, the application program may be abnormally terminated, which is very inconvenient to the user.

SUMMARY OF THE INVENTION

Accordingly, the present disclosure is directed to a display method and a portable device, in which a user can intuitionally identify whether an application program installed in the portable device, can be successfully executed in the portable device.

The present disclosure provides a display method adapted to a portable device. The portable device has a touch screen, the touch screen has a first display format, and at least one application program is installed in the portable device. The display method includes following steps. A display signal is received, and a menu interface and an object corresponding to the application program are displayed according to the display signal. A display format supported by each application program is obtained. Whether the display format supported by the application program matches the first display format of the touch screen of the portable device is determined. When the display format supported by the application program does not match the first display format, a first annotation message is shown on the object corresponding to the application program.

According to an embodiment of the present disclosure, the display method further includes following steps. A first modification command is received from the object corresponding to one of the application programs in the menu interface, and the first annotation message is removed from the object corresponding to the application program.

According to an embodiment of the present disclosure, the display method further includes following step. When the application program having the first annotation message is executed in the menu interface, a first prohibition warning message is displayed on the touch screen of the portable device.

According to an embodiment of the present disclosure, the display method further includes following steps. When the portable device is coupled to an external device, whether the display format supported by the application program installed in the portable device matches a first display format of the external device is determined. If the display format supported by the application program does not match the first display format of the external device, a first annotation message is shown on the object corresponding to the application program.

The present disclosure provides a portable device including a touch screen, a storage unit, and a processor. The touch screen receives a display signal and has a first display format. The touch screen displays a menu interface and an object corresponding to at least one application program. The storage unit stores the application program and the menu interface. The processor is coupled to the touch screen and the storage unit. When the processor executes the application program, the processor obtains a display format supported by the application program and determines whether the display format supported by the application program matches the first display format of the touch screen. When the display format supported by the application program does not match the first display format of the touch screen, the processor shows a first annotation message on the object corresponding to the application program.

According to an embodiment of the present disclosure, when the processor determines whether the display format supported by the application program matches the first display format of the touch screen, the processor obtains a flag of the application program (where the flag represents the display format supported by the application program) and determines whether the flag has a first value. When the flag has the first value, the processor determines that the display format supported by the application program does not match the first display format.

According to an embodiment of the present disclosure, when the processor executes the application program, the processor further receives a first modification command from the object corresponding to the application program and removes the first annotation message from the object corresponding to the application program.

According to an embodiment of the present disclosure, when the processor executes the application program having the first annotation message in the menu interface, the portable device further displays a first prohibition warning message on the touch screen.

According to an embodiment of the present disclosure, when the processor executes the at least one application program and the portable device is coupled to an external device, the processor further determines whether the display format supported by the application program installed in the portable device matches a first display format of the external device. When the display format supported by the application program does not match the first display format of the external device, the processor shows a first annotation message on the object corresponding to the application program.

As described above, when a portable device receives a display signal, the portable device displays a menu interface and an object corresponding to an application program. When the object corresponding to the application program is displayed, the portable device shows an annotation message on the object corresponding to the application program if the application program is a specific application program supporting a specific display format. Thereby, users can intuitionally identify which application programs support the portable device through the annotation messages displayed on the objects corresponding to the application programs, so that operating the portable device is made very convenient.

These and other exemplary embodiments, features, aspects, and advantages of the invention will be described and become more application program are not from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The present disclosure provides a display method and a portable device, in which a user is allowed to intuitionally identify whether an application program is designed regarding the display format of the touch screen of a specific portable device.

Figure 1A:
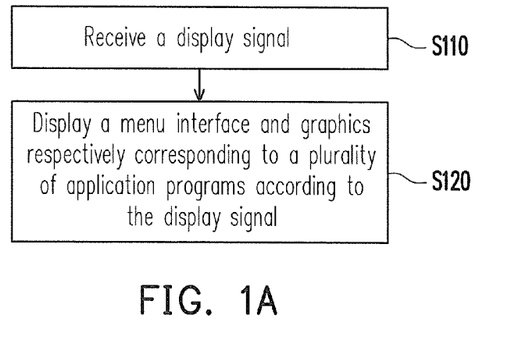
FIG. 1A and FIG. 1B are flowcharts of a display method according to a first embodiment of the present disclosure.

FIG. 1A is a flowchart of a display method according to a first embodiment of the present disclosure. Referring to FIG. 1A, the display method in the present embodiment is executed by a portable device. The portable device may be a smart phone or a tablet PC, etc. However, the type of the portable device is not limited in the present disclosure. For the convenience of description, below, a cell phone will be taken as an example of the portable device for describing various steps of the display method.

In step S110, the portable device receives a display signal. To be specific, the portable device has a touch screen. The touch screen may be any type of touch screen, such as a resistive touch screen or a capacitive touch screen. The touch screen displays a menu interface and objects corresponding to a plurality of application programs. The portable device receives user inputs (application programs or widgets). According to the present disclosure, a user can install different application programs on a portable device, and the application programs include application programs exclusively executed by tablet PCs (tablet-specific application programs) and application programs exclusively executed by smart phones (phone-specific application programs).

Figure 1B:
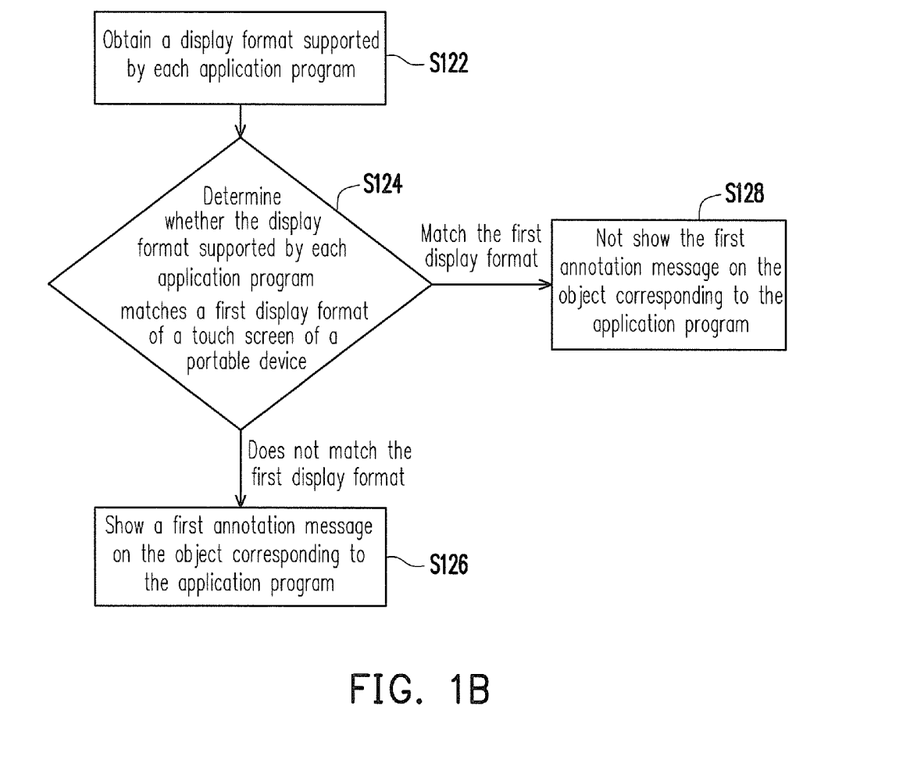
Figure 2A:
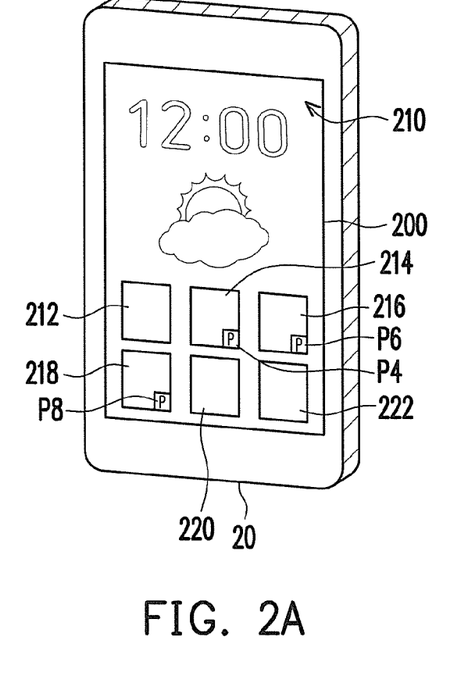
FIG. 2A illustrates a portable device according to the first embodiment of the present disclosure.

FIG. 1B is a flowchart of a display method according to the first embodiment of the present disclosure. FIG. 2A illustrates a portable device according to the first embodiment of the present disclosure. Referring to both FIG. 1B and FIG. 2A, the portable device 20 has a touch screen 200. The touch screen 200 displays a menu interface 210 and objects (application program shortcuts or widgets) 212-222 corresponding to a plurality of application programs. In the present embodiment, when aforementioned application programs (tablet-specific application programs and phone-specific application programs) are installed in the same portable device 20, the portable device 20 categorizes the application programs according to the display formats (only supported by tablet-specific application programs or phone-specific application programs) supported by these application programs and displays the menu interface 210 and the objects 212-222 corresponding to the application programs on the touch screen 200, so that a user can identify the application programs conveniently and won't execute any unsuitable application program.

The portable device 20 in the present embodiment allows a user to install application programs supporting different display formats. After the application programs are installed, the portable device 20 identifies the application programs according to the display formats supported by the application programs and displays the objects 212-222 corresponding to the application programs on the touch screen 200. In step S122, the portable device 20 obtains the display format supported by each application program. The display format (for example, resolution, display dimensions, and display color depth) supported by an application program indicates the portable devices (tablets or smart phones) supported by the application program. For example, as to a tablet-specific application program, the resolution recorded in the display format thereof may be 1024×768, 2048×1536, or 2560×1600, or the dimensions of a supported touch screen recorded therein may be 7", 10.1", or 11.6". As to a phone-specific application program, the resolution recorded in the display format thereof may be 480×320 or 960×640, or the dimensions of a supported touch screen recorded therein may be 3.5"-3.8" or 4.5"-4.9". However, the invention is not limited thereto.

Thereby, by obtaining the display formats supported by the application programs corresponding to the objects 212-222, the portable device 20 can identify a portable device (smart phone or tablet) supported by each application program in subsequent steps.

In step S124, the portable device 20 determines whether the display format supported by each application program matches a first display format of the touch screen 200 in the portable device 20. Herein the first display format is the display format supported by the touch screen of a smart phone. The resolution recorded in the first display format may be 480×320 or 960×640, and the display dimensions recorded therein may be 3.5"-3.8" or 4.5"-4.9". However, the invention is not limited thereto. When the display format supported by the application program does not match the first display format of the touch screen of the smart phone, the portable device 20 determines that the application program is an application program exclusively executed on tablet PCs (i.e., a tablet-specific application program) and is not suitable for being executed on a smart phone. Contrarily, if the display format supported by the application program matches the first display format of the touch screen, the portable device 20 determines that the application program is designed to be exclusively executed on smart phones or to be executed on both smart phones and tablet PCs.

As described above, when the display format supported by any application program installed in the portable device 20 does not match the first display format of the touch screen of the portable device 20 (smart phone), in step S126, the portable device 20 shows an annotation message on the object corresponding to the application program. If the display format supported by an application program installed in the portable device 20 matches the first display format of the touch screen of the portable device 20, in step S128, the portable device 20 does not show the annotation message on the object corresponding to the application program.

In the present embodiment, an annotation message represents the display format of the portable device supported by an application program. Referring to FIG. 2A, if the display formats supported by the application programs in the portable device 20 (a smart phone) corresponding to the objects 214, 216, and 218 do not match the first display format of the touch screen of the smart phone, the portable device 20 (a smart phone) shows annotation messages p4, p6, and p8 on the objects 214, 216, and 218. In the present embodiment, the annotation messages p4, p6, and p8 are PAD-specific annotation messages. Such an annotation message notifies the user that the application program is not suitable for being executed on the portable device 20 (a smart phone). Because the display format supported by the application program does not match the first display format of the touch screen 200 of the smart phone, in the present disclosure, an annotation message is used for notifying the user, so as to prevent the user from executing any unsuitable application program.

The portable device 20 (smart phone) can identify each application program installed in the portable device (smart phone) every time when an application program is installed and shows the annotation messages p4, p6, and p8 on the objects 214, 216, and 218 corresponding to the application programs not supporting the portable device 20, so that a user can identify whether the application program is suitable for being executed on the portable device 20.

In the present embodiment, the portable device 20 (smart phone) can display an annotation message on the object corresponding to an application program according to a flag stored therein. To be specific, when the portable device 20 is a smart phone, if the application programs installed in the portable device 20 (for example, the application programs corresponding to the objects 214, 216, and 218) can only be executed on tablet PCs, the display format supported by the application programs matches the format of tablet-specific application programs. Besides, when the touch screen 200 displays the menu interface 210, the objects (for example, the objects 214, 216, and 218) corresponding to the application programs are annotated (for example, with the annotation messages p4, p6, and p8) to notify the user that these application programs can only be executed on a tablet PC.

The portable device 20 can record each installed application program that has been identified through the technique described above according to the display format supported by the application program. In the present disclosure, the portable device 20 records a flag of each application program. Thus, every time when the portable device 20 is turned on, the portable device 20 needs not to identify the display format of each application program again. Instead, the portable device 20 can directly read the flag of each application program stored therein and determine the portable device (tablet or smart phone) supported by the application program according to the flag.

Aforementioned flag represents the display format supported by an application program. The portable device 20 finds the flag corresponding to each application program. A flag can be set according to the first display format of the touch screen of a portable device supported by each application program. For example, if the resolution recorded in the display format supported by an application program is 1024×768 (i.e., the application program can only support portable devices (for example, tablet PCs) having a resolution of 1024×768), the flag corresponding to the application program is set to have a first value "P" (in short, first value P). On the other hand, if the resolution recorded in the display format supported by an application program is 480×320 (i.e., the application program can only support portable devices (for example, smart phones) having a resolution of 480×320), the flag corresponding to the application program is set to have a second value "F" (in short, second value F).

In the present embodiment, when the portable device 20 is a smart phone, if the information recorded in the display format supported by an application program indicates that the application program can only support tablet PCs, the flag of the application program is set to have the first value P. When the portable device 20 determines that the flag of the application program has the first value P and the touch screen 200 of the portable device 20 displays the object corresponding to the application program, the portable device 20 shows annotation messages (for example, the annotation messages p4, p6, and p8) on the objects (for example, the objects 214, 216, and 218) corresponding to the application programs according to the content of the first value, so as to notify the user that these application programs with the annotation messages can only be executed on tablet PCs (i.e., tablet-specific application programs). If the display format supported by an application program indicates that the application program can only be executed on smart phones, the flag of the application program is set to have the second value F.

When the user is about to start or execute the application programs corresponding to the objects 214, 216, and 218 on the portable device 20 (i.e., the application programs corresponding to the objects 212, 220, and 222 have the objects 214, 216, and 218 with the annotation messages p4, p6, and p8), the portable device 20 receives a start signal of the application program corresponding to the object 214 and determines whether the flag of the application program has the first value P (i.e., determines whether the display format supported by the application program corresponding to the object 214 matches the first display format of the touch screen of the portable device 20). Besides, when the flag has the first value P (i.e., the display format supported by the application program corresponding to the object 214 does not match the first display format), the touch screen 200 displays a prohibition warning message (for example, "tablet-specific application program, this application program is not to be executed on a smart phone") in the menu interface 210 to notify the user that the application program is not suitable for being executed on the portable device 20. Because the display format supported by the application program does not match the first display format of the touch screen, the user is recommended not to execute the application program.

Accordingly, when the portable device 20 is a smart phone and receives a display signal to display the object corresponding to each application program, the portable device 20 shows an annotation message on the objects corresponding to tablet-specific application programs. Thereby, when the user starts the application programs, the user can identify which application programs are tablet-specific application programs according to the annotation message on the corresponding objects.

Additionally, the portable device 20 receives a modification command from the object corresponding to an application program and removes the annotation message from or shows the annotation message on the object corresponding to the application program, which will be explained below with reference to an example.

Figure 2B:
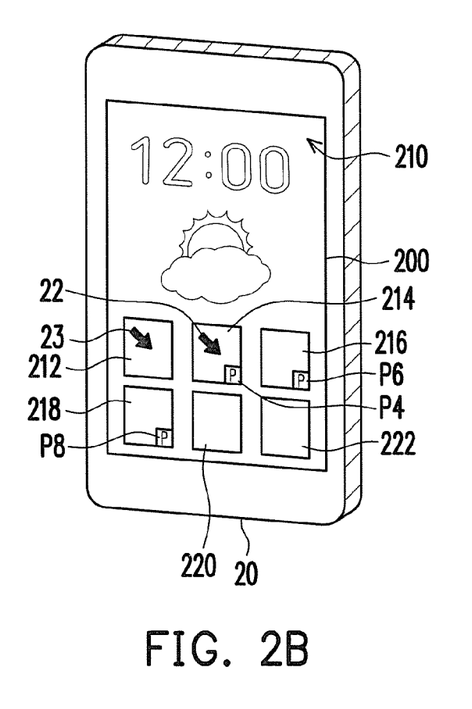
FIG. 2B and FIG. 2C illustrate a portable device respectively when an annotation message is removed and shown according to the first embodiment of the present disclosure.
Figure 2C:
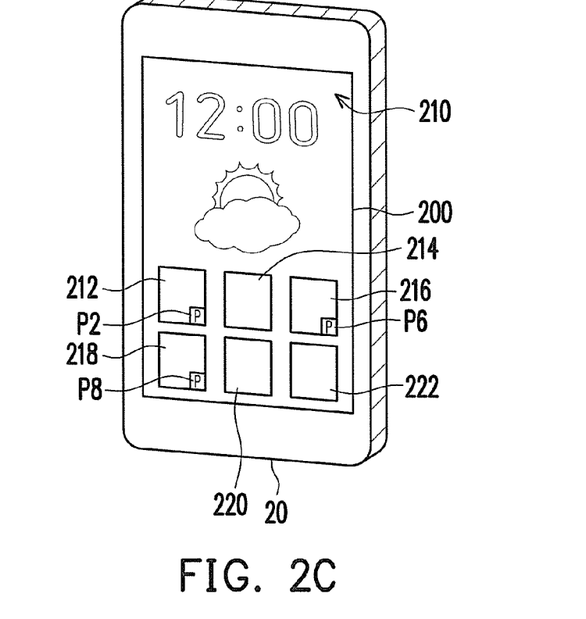

FIG. 2B and FIG. 2C illustrate a portable device respectively when an annotation message is removed and shown according to the first embodiment of the present disclosure. Referring to FIG. 2B, it is assumed that the portable device 20 receives a first modification command from the object 214 corresponding to an application program. Herein the first modification command may be the user clicking the object 214 or staying for a predetermined time on the object 214 (for example, the object 214 indicated by the arrow 22 in FIG. 2B).

Then, the portable device 20 determines whether the flag of the application program corresponding to the object 214 has the first value P. Because the annotation message p4 is shown on the object 214 (i.e., the flag of the application program corresponding to the object 214 has the first value P), when the portable device 20 receives the first modification command from the object 214, the portable device 20 changes the flag of the application program corresponding to the object 214 to a value different from the first value P (for example, the second value F) and removes the annotation message from the object 214 corresponding to the application program, as shown in FIG. 2C. Namely, no annotation message is shown on the object 214 in FIG. 2C.

Thereby, the user can determine how to display some application programs in the menu interface 210, so as to find these application programs in the menu interface 210 instantly.

Figure 3:
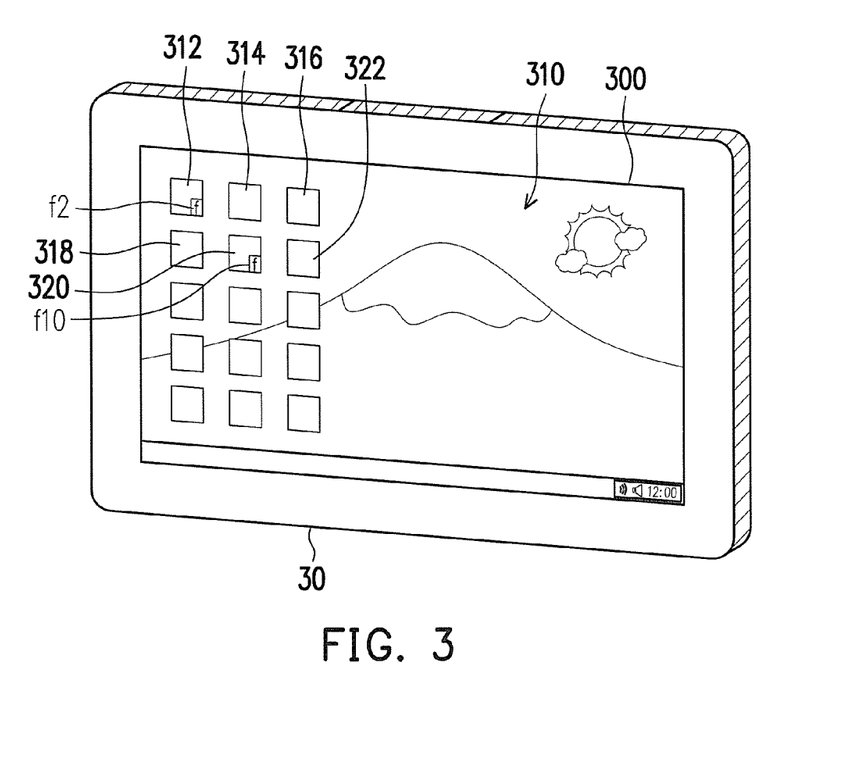
FIG. 3 illustrates a portable device according to a second embodiment of the present disclosure.

FIG. 3 illustrates a portable device according to a second embodiment of the present disclosure. Referring to FIG. 3, the display method in the present embodiment is similar to that in the first embodiment, and the difference is that in the present embodiment, the display method provided by the present disclosure is executed by a tablet PC. The present embodiment will be described below with reference to the display method illustrated in FIG. 1A and FIG. 1B.

In the present embodiment, after the portable device 30 (a tablet PC) receives a display signal, the touch screen 300 displays a menu interface 310 and objects 312-322 corresponding to a plurality of application programs according to the display signal (step S110 and step S120). When the touch screen 300 displays the objects 312-330 corresponding to the application programs, the portable device 30 obtains a display format supported by each application program (step S122) and determines whether the display format supported by the application program matches a first display format (step S124). In the present embodiment, the first display format is the display format supported by the touch screen 300 of the portable device 30 (tablet PC). The resolution recorded in the first display format may be 1024×768, 2048×1536, or 2560× 1600, and the display dimensions recorded therein may be 10.1" or 11.6". However, the present disclosure is not limited thereto. When the portable device 30 (tablet PC) determines that the display format supported by an application program does not match the first display format, the application program is designed to be executed on smart phones only (phone-specific application program) and is not suitable for being executed on a tablet PC. If the display format supported by the application program matches the first display format, the application program is a tablet-specific application program supporting the portable device 30 (tablet PC) or an application program supporting both tablet PCs and smart phones.

As described in the first embodiment, when the display format supported by any application program installed in the portable device 30 does not match the first display format of the touch screen 300 of the portable device 30 (tablet PC), the portable device 30 shows an annotation message on the object corresponding to the application program (step S126). In the present embodiment, the annotation message indicates the display format of portable devices supported by the application program.

Referring to FIG. 3, assuming that the display format of the application programs installed in the portable device 30 (tablet PC) corresponding to the objects 312 and 320 does not match the first display format of the touch screen 300 of the portable device 30 (tablet PC), the portable device 30 (tablet PC) shows annotation messages f2 and f10 on the objects 312 and 320. In the present embodiment, the annotation messages f2 and f10 indicate phone-specific application programs, and such an annotation message notifies the user that the application program is not suitable for being executed on the portable device 30 (tablet PC). Because the display format supported by the application program does not match the first display format of the touch screen 300 of the portable device 30 (tablet PC), in the present disclosure, the annotation messages are used for notifying the user to prevent the user from executing unsuitable application programs.

The portable device 30 (tablet PC) can identify each application program installed in the portable device 30 every time when an application program is installed and display the annotation messages f2 and f10 on the objects 312 and 320 corresponding to the application programs not supporting the portable device 30, so as to allow a user to determine whether an application program is suitable for being executed on the portable device 30.

Additionally, in the present embodiment, the portable device 30 (tablet PC) can determine whether an annotation message should be shown on the object corresponding to an application program according to a flag of the application program.

To be specific, when the portable device 30 is a tablet PC, if application programs (for example, the application programs corresponding to the objects, 312 and 320) installed in the portable device 30 can only be executed on smart phones, the display format supported by the application programs does not match the first display format of the portable device 30. Besides, when the touch screen 300 displays the menu interface and the objects corresponding to the application programs, the objects (for example, the objects 312 and 320) of the application programs are annotated (for example, with annotation messages f2 and f8) to notify the user that these application programs can only be executed on smart phones.

Each installed application program that has been identified through the technique described above according to the display format supported by the application program. In the present disclosure, the portable device 30 records a flag of each application program. Thus, every time when the portable device 30 is turned on, the portable device 30 needs not to identify the display format of each application program again. Instead, the portable device 30 can directly read the flag of each application program stored therein and determine the portable device (tablet or smart phone) supported by the application program according to the flag. A flag represents the display format supported by an application program. The portable device 30 finds the flag corresponding to each application program. A flag can be set according to the first display format of the touch screen 300 of the portable device 30 supported by each application program.

To be specific, the flag represents the display format supported by an application program. The portable device 30 finds the flag corresponding to each application program. If the display format supported by an application program is display formats of only smart phones (phone-specific application program), the flag of the application program in the present embodiment is set to have a first value "f" (in short, first value f). When the portable device 30 is a tablet PC, the portable device 30 obtains the flag of each application program and determines whether the flag of the application program has the first value f. When the flag of an application program has the first value f, the portable device 30 further determines whether the display format supported by the application program is a display format specific to smart phone. If the resolution recorded in the display format supported by an application program is 480×320, the application program can support only portable devices (for example, smart phones) having the resolution 480×320. Thus, the flag of the application program is set to a second value "F" (in short, second value F). After that, when the touch screen 300 of the portable device 30 displays the application programs, it annotates the objects 312-322 corresponding to the application programs according to the first value f (for example, with the annotation messages f2 and f10).

As shown in FIG. 3, because the display format supported by the application programs corresponding to the objects 314, 316, 318, and 322 matches the first display format of the touch screen of a tablet PC, the portable device 30 does not show any annotation message on the objects 314, 316, 318, and 322.

When a user is about to start or execute the application program corresponding to the object 312 on the portable device 30, because the application program corresponding to the object 312 has the annotation message f2, after the portable device 30 receives a start signal for the application program corresponding to the object 312, it determines whether the flag of the application program has the first value f. Namely, the portable device 30 determines whether the display format supported by the application program corresponding to the object 312 matches the first display format of the touch screen of the portable device 30. Besides, if the flag has the first value f (i.e., the display format supported by the application program corresponding to the object 312 does not match the first display format), the touch screen 300 displays a prohibition warning message (for example, "phone-specific application program, this application program is not to be executed on a tablet PC") in the menu interface 310 to notify the user that the application program is not suitable for being executed on the current portable device. Because the display format supported by the application program does not match the first display format of the touch screen, the user is not recommended to execute the application program.

Accordingly, when the portable device 30 is a tablet PC and receives a display signal to display the object corresponding to each application program, the portable device 30 shows an annotation message on the objects corresponding to phone-specific application programs. Thereby, when the user starts the application programs, the user can identify which application programs are phone-specific application programs according to the annotation message on the corresponding objects.

As described in foregoing embodiment, in the display method of the present embodiment, a modification command is further received through the object corresponding to one of the application programs in the portable device 30, and the annotation message is shown on or removed from the object corresponding to the application program. This step is similar to that described in foregoing embodiment therefore will not be further described herein.

Figure 4A:
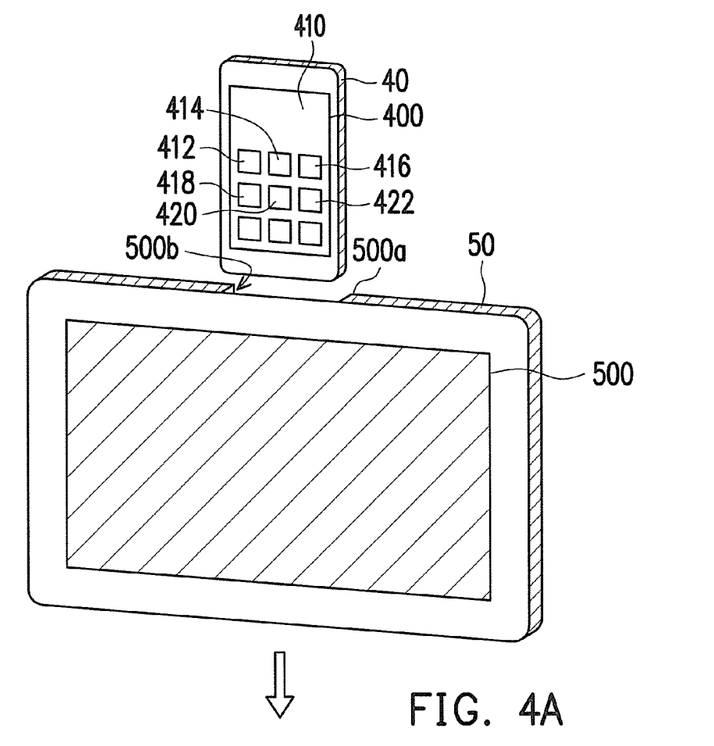
FIGS. 4A-4B are schematic diagrams of a hybrid portable device before and after assembly according to another embodiment of the present disclosure.
Figure 4B:
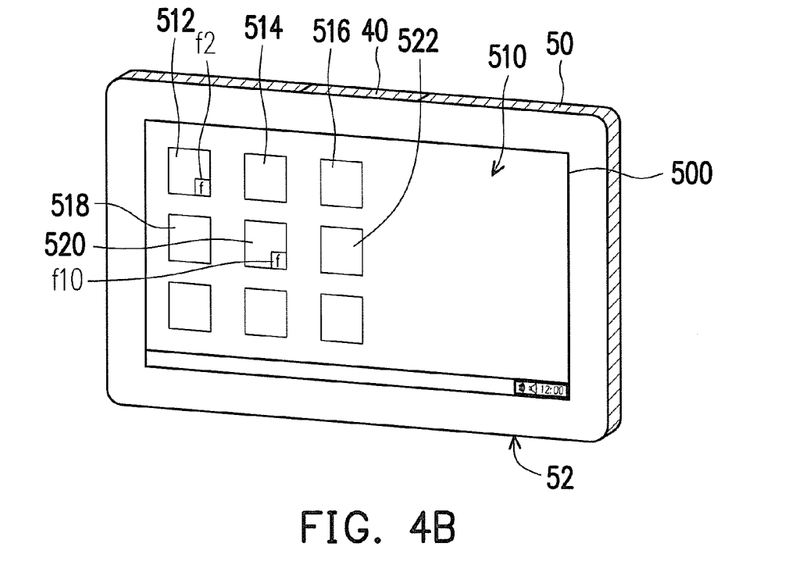

FIGS. 4A-4B are schematic diagrams of a hybrid portable device before and after assembly according to another embodiment of the present disclosure. Referring to FIG. 4A, in the present embodiment, the display method is executed by a smart phone 40. The smart phone 40 is coupled to a tablet PC 50 through a connection port (not shown) on the smart phone 40. The tablet PC 50 has a touch screen 500. After the tablet PC 50 is coupled to the smart phone 40, the tablet PC 50 receives a control signal from the smart phone 40 and displays images on the touch screen 500 of the tablet PC 50. For example, the menu interface 410 and the objects 412-422 corresponding to different application programs originally displayed on the smart phone 40 are displayed on the touch screen 500 of the tablet PC 50 instead (i.e., the objects 412-422 turn into the objects 512-522). To be specific, the back surface 500a of the tablet PC 50 (the surface opposite to the touch screen 500) has a slot (not shown) and a slide 500b. The smart phone 40 can be inserted into the slot through the slide 500b and aforementioned connection port to be coupled to the tablet PC 50, so that the smart phone 40 and the tablet PC 50 are combined into a hybrid portable device 52 (as shown in FIG. 4B).

When the smart phone 40 is not coupled to the tablet PC 50 and receives a display signal to display the menu interface 410 and the objects corresponding to the application programs on the touch screen 400, the smart phone 40 determines whether the display format supported by each application program matches a display format supported by the smart phone 40.

It should be noted that in the present embodiment, the touch screen 400 of the smart phone 40 and the touch screen 500 of the tablet PC 50 have different display formats. For example, the resolution of the touch screen 400 of the smart phone 40 is 480×320, while the resolution of the touch screen 500 of the tablet PC 50 is 1024×768. When the two devices are combined into the hybrid portable device 52, the application programs installed in the smart phone 40 are identified by comparing the display format of each application program with the first display format (for example, with the resolution of 1024×768) of the touch screen 500 of the tablet PC 50 instead of the first display format of the touch screen 400 of the smart phone 40. All the application programs are presented on the touch screen 500 of the tablet PC 50. When the display formats supported by the application programs do not match the first display format of the touch screen 500 of the tablet PC 50, the application programs are determined to be phone-specific application programs, and the touch screen 500 shows the annotation messages f2 and f10 on the objects 512 and 520 corresponding to the application programs.

Figure 5:
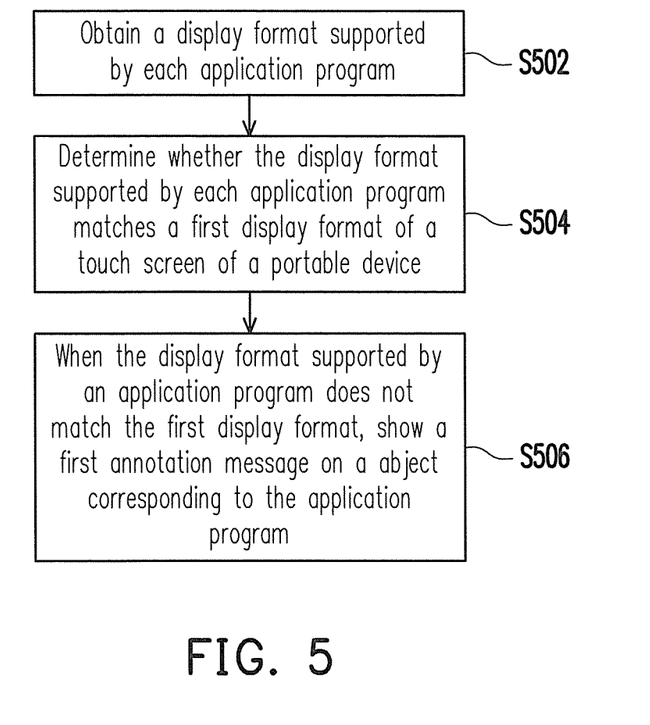
FIG. 5 is a flowchart of a display method of the hybrid portable device in FIG. 4B.

FIG. 5 is a flowchart of a display method of the hybrid portable device 52 in FIG. 4B. Referring to FIG. 4A, FIG. 4B, and FIG. 5, when the smart phone 40 is coupled to the tablet PC 50 and the smart phone 40 displays the objects 512-522 corresponding to the application programs on the tablet PC 50, in step S502, the smart phone 40 obtains the display format supported by each installed application program, and in step S504, the smart phone 40 determines whether the display format supported by each application program matches the first display format of the touch screen 500 of the tablet PC 50.

To be specific, the smart phone 40 determines whether the display format supported by each application program matches the first display format of the tablet PC 50. Herein the smart phone 40 can do so by obtaining the flag of each application program and checking the content of the flag.

If an application program in the smart phone 40 is a tablet-specific application program or an application program can be executed on both tablet PCs and smart phones, the application program can be directly executed. In this case, the tablet PC 50 does not display the prohibition warning message mentioned in foregoing embodiment on the touch screen 500.

Figure 6:
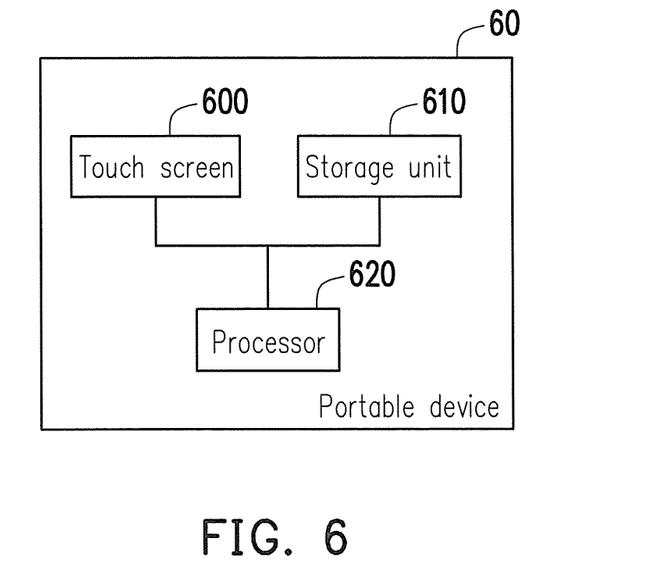
FIG. 6 is a diagram of a portable device according to a third embodiment of the present disclosure.

The display method in foregoing embodiment can be implemented by executing a menu interface and application programs on a portable device. FIG. 6 is a diagram of a portable device according to a third embodiment of the present disclosure. Referring to FIG. 6, the portable device 60 includes a touch screen 600, a storage unit 610, and a processor 620. The touch screen 600 receives a display signal. The storage unit 610 stores at least one application program and a menu interface. The processor 620 is coupled to the touch screen 600 and the storage unit 610. The processor 620 executes several commands of the menu interface to implement the display method described in foregoing embodiment. In the present embodiment, the processor 620 executes the steps of the menu interface described in foregoing embodiments (steps S110-S120, steps S122-S128, and steps S502-S506 and the embodiments illustrated in FIGS. 2A-2C, FIG. 3, FIGS. 4A-4B, and FIG. 5), and these steps will not be described herein.

As described above, when a portable device receives a display signal, the portable device displays a menu interface and objects corresponding to different application programs. The portable device determines whether each application program is designed regarding a specific display format (phone-specific application program or tablet-specific application program). If an application program is designed regarding a specific display format, the portable device shows an annotation message on the object corresponding to the application program. Besides, if a portable device (a smart phone) is coupled to an external device (a tablet PC) to form a hybrid portable device, the portable device also determines whether an application program is designed regarding a specific display format. If the application program does not support the display format of the touch screen of the portable device, the portable device also shows an annotation message on the object corresponding to the application program. Accordingly, a user can identify the application programs supporting the present portable device through the annotation messages shown on the menu interface. Thereby, the display method and the portable device provided by the present disclosure allow a user to intuitively identify whether an application program is designed regarding a specific display format, so that operating the portable device is made very convenient to the user.

It will be application program are not to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims and their equivalents.

What is claimed is:

1. A display method, adapted to a portable device, wherein the portable device has a touch screen, the touch screen has a first display format, and at least one application program is installed in the portable device, the display method comprising:

receiving a display signal;

displaying a menu interface and an object corresponding to the at least one application program according to the display signal;

obtaining a display format supported by the at least one application program;

determining whether the display format supported by the at least one application program matches the first display format; and when the display format supported by the at least one application program does not match the first display format, showing a first annotation message on the object corresponding to the at least one application program, receiving a first modification command to modify the display format supported by the least one application program, and removing the first annotation message on the object corresponding to the at least one application program after the display format supported by the least one application program is modified.

2. The display method according to claim 1 further comprising:

when the portable device is coupled to an external device, determining whether the display format supported by the at least one application program installed in the portable device matches a first display format of the external device, and when the display format supported by the at least one application program does not match the first display format of the external device, showing a first annotation message on the object corresponding to the at least one application program.

3. A portable device, comprising:

a touch screen, having a first display format, and displaying a menu interface and an object corresponding to at least one application program;

a storage unit, storing the at least one application program and the menu interface; and a processor, coupled to the touch screen and the storage unit, wherein when the processor executes the at least one application program, the processor obtains a display format supported by the at least one application program;

the processor determines whether the display format supported by the at least one application program matches the first display format of the touch screen; and when the display format supported by the at least one application program does not match the first display format, the processor shows a first annotation message on the object corresponding to the at least one application program, wherein when the processor executes the at least one application program, the processor further receives a first modification command to modify the display format supported by the at least one application program and removes the first annotation message on the object corresponding to the at least one application program after the display format supported by the at least one application program is modified.

4. The portable device according to claim 3, wherein when the processor determines whether the display format supported by the at least one application program matches the first display format, the processor obtains a flag of the at least one application program, wherein the flag represents the display format;

the processor determines whether the flag has a first value; and when the flag has the first value, the processor determines that the display format does not match the first display format.

5. The portable device according to claim 3, wherein when the processor executes the at least one application program, when the portable device is coupled to an external device, the processor further determines whether the display format supported by the at least one application program installed in the portable device matches a first display format of the external device, and when the display format supported by the at least one application program does not match the first display format of the external device, the processor shows a first annotation message on the object corresponding to the at least one application program.

\* \* \* \* \*